United States Patent
Cotta

(10) Patent No.: US 10,187,800 B2
(45) Date of Patent: *Jan. 22, 2019

(54) SECURE DEVICE PAIRING

(71) Applicant: Sony Interactive Entertainment America LLC, San Mateo, CA (US)

(72) Inventor: Bryan Cotta, San Mateo, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/040,355

(22) Filed: Jul. 19, 2018

(65) Prior Publication Data

US 2018/0324589 A1 Nov. 8, 2018

Related U.S. Application Data

(63) Continuation of application No. 14/882,840, filed on Oct. 14, 2015, now Pat. No. 10,034,171.

(51) Int. Cl.
| | |
|---|---|
| H04L 29/06 | (2006.01) |
| H04W 12/06 | (2009.01) |
| H04W 12/04 | (2009.01) |
| H04L 9/08 | (2006.01) |
| H04L 9/06 | (2006.01) |
| H04W 12/02 | (2009.01) |
| H04L 9/32 | (2006.01) |

(52) U.S. Cl.
CPC .......... *H04W 12/06* (2013.01); *H04L 9/0631* (2013.01); *H04L 9/0637* (2013.01); *H04L 9/0822* (2013.01); *H04L 9/0894* (2013.01); *H04L 9/3271* (2013.01); *H04L 63/0428* (2013.01); *H04L 63/061* (2013.01); *H04L 63/08* (2013.01); *H04W 12/02* (2013.01); *H04W 12/04* (2013.01); *H04L 2209/80* (2013.01); *H04L 2463/062* (2013.01)

(58) Field of Classification Search
CPC .... H04W 12/06; H04W 12/04; H04L 9/0631; H04L 9/0894; H04L 9/0637; H04L 63/0428
See application file for complete search history.

(56) References Cited

U.S. PATENT DOCUMENTS

| | | |
|---|---|---|
| 8,909,933 B2 | 12/2014 | Pieczul et al. |
| 10,034,171 B2 | 7/2018 | Cotta |
| 2008/0069351 A1 | 3/2008 | Walker et al. |
| 2010/0325544 A1 | 12/2010 | Alhadeff et al. |
| 2011/0091026 A1 | 4/2011 | Oortmarssen et al. |
| 2011/0200189 A1 | 8/2011 | True et al. |
| 2014/0006784 A1 | 1/2014 | Walker et al. |
| 2014/0013100 A1 | 1/2014 | Menzel et al. |
| 2015/0011970 A1 | 1/2015 | Kamen et al. |

(Continued)

*Primary Examiner* — Brandon S Hoffman
*Assistant Examiner* — William A Corum, Jr.
(74) *Attorney, Agent, or Firm* — John L. Rogitz

(57) ABSTRACT

A machine readable quick response (QR) code or, if this fails, a human-readable passcode is presented on a display of a server device for scanning (or reading and human input) into a mobile device. The mobile device computes a response and returns it to the server. If the response is correct, WiFi setup information, which can include PII, is exchanged in an encrypted form between the two devices to support subsequent WiFi communication.

19 Claims, 8 Drawing Sheets

(56) References Cited

U.S. PATENT DOCUMENTS

| | | |
|---|---|---|
| 2015/0023501 A1 | 1/2015 | Taylor et al. |
| 2015/0067339 A1 | 3/2015 | Paris et al. |
| 2016/0227474 A1 | 8/2016 | McRae |
| 2017/0019935 A1 | 1/2017 | Palin et al. |
| 2017/0026778 A1* | 1/2017 | Yamada ................ H04W 4/008 |
| 2017/0048243 A1* | 2/2017 | Hardy ................ H04L 41/0806 |
| 2017/0111170 A1 | 4/2017 | Baghdasaryan |
| 2018/0109380 A1* | 4/2018 | Hoy ................ H04L 9/0869 |
| 2018/0123799 A1* | 5/2018 | Hamid ................ G06F 3/167 |

* cited by examiner

SECURE DEVICE PAIRING

FIELD

The application relates generally to secure device pairing.

BACKGROUND

The proliferation of multimedia devices (e.g. Google Chromecast, Roku, Amazon FireTV, all of which are names are protected by trademarks) that access user accounts, WiFi passwords, content, and personally identifiable information (PII) has increased significantly. Most of the available offerings do not offer a way to securely pair with other mobile devices and user networks. These devices are typically very low cost and security is an afterthought. Expensive security methods are not fully employed to protect the user, content provider, or device manufacturer.

SUMMARY

Accordingly, present principles establish a secure yet simple device pairing method for devices using wither a scanned machine-readable quick response (QR) code or a short human-readable passcode.

In a first aspect, a device has a computer memory that is not a transitory signal and that includes instructions executable by a processor to receive a WiFi connection request from a mobile communication device (MCD). Responsive to a determination that a hello message from the MCD has a predetermined ciphersuite, the instructions are executable to establish communication with the MCD, present on a display a pseudorandom passcode P, and send to the MCD a pseudorandom challenge C. The instructions are also executable to, responsive to determining that a response from the MCD based on P and C and matches a test value, and responsive to a determination that P was displayed less than a threshold period of time prior to receiving the response, return a communication key to the MCD. However, if a response from the MCD matching the test value is not received or if a response is received after the threshold period of time, a new P and C are generated and the process repeats.

In some embodiments, the instructions may be executable to access a root key of the device, use the root key of the computing device to establish a master key, use the master key in turn to establish the communication key, and send the communication key to the MCD to enable the MCD to encrypt WiFi information with the communication key. The instructions may be further executable to access the WiFi information received from the MCD and encrypt the WiFi information using a WiFi key derived from the master key.

The communication key may be stored in a secure area of storage encrypted with a random encryption code such as advanced encryption standard (AES) XEX encryption mode withtweak and ciphertext stealing (XTS) having a first tweak value equal to a key number of the derived key and a second tweak value equal to an AES block number. Or the random encryption code can include Liskov, Rivest, Wagner (LRW) encryption, cipher block chaining-mask-cipher block chaining (CMC) encryption, electronic codebook-mask-electronic codebook (EME) encryption.

In another aspect, a device has a computer memory that is not a transitory signal and that includes instructions executable by a processor to receive a WiFi connection request from a mobile communication device (MCD), and responsive to a determination that a hello message from the MCD has a predetermined ciphersuite, establish communication with the MCD. The instructions are executable to generate a pseudorandom key value Q, embed Q in a machine-readable quick response (QR) code, and present the QR code such that the QR code is readable by the MCD. A pseudorandom challenge C is sent to the MCD. Responsive to determining that a response from the MCD is based on Q and C and matches a test value, a communication key is returned to the MCD, whereas responsive to not receiving a response from the MCD matching the test value, a communication key is not returned to the MCD.

In another aspect, a mobile communication device (MCD) has a computer memory that is not a transitory signal and that includes instructions executable by a processor to receive a code (either a machine-readable QR code or a human-readable passcode) generated by a server, combine the code with a challenge received from the server to render a response, and send the response to the server. The instructions are executable to access a communication key received from the server and send to the server wireless communication configuration information. The instructions can be executable to encrypt the wireless communication configuration information using the communication key prior to sending the wireless configuration information to the server. In some examples, the instructions also are executable to present on a display of the MCD a user interface (UI) including at least one selector selectable to enter a mode in which the code is a human-readable passcode.

The details of the present application, both as to its structure and operation, can best be understood in reference to the accompanying drawings, in which like reference numerals refer to like parts, and in which:

DETAILED DESCRIPTION

Figure 1:
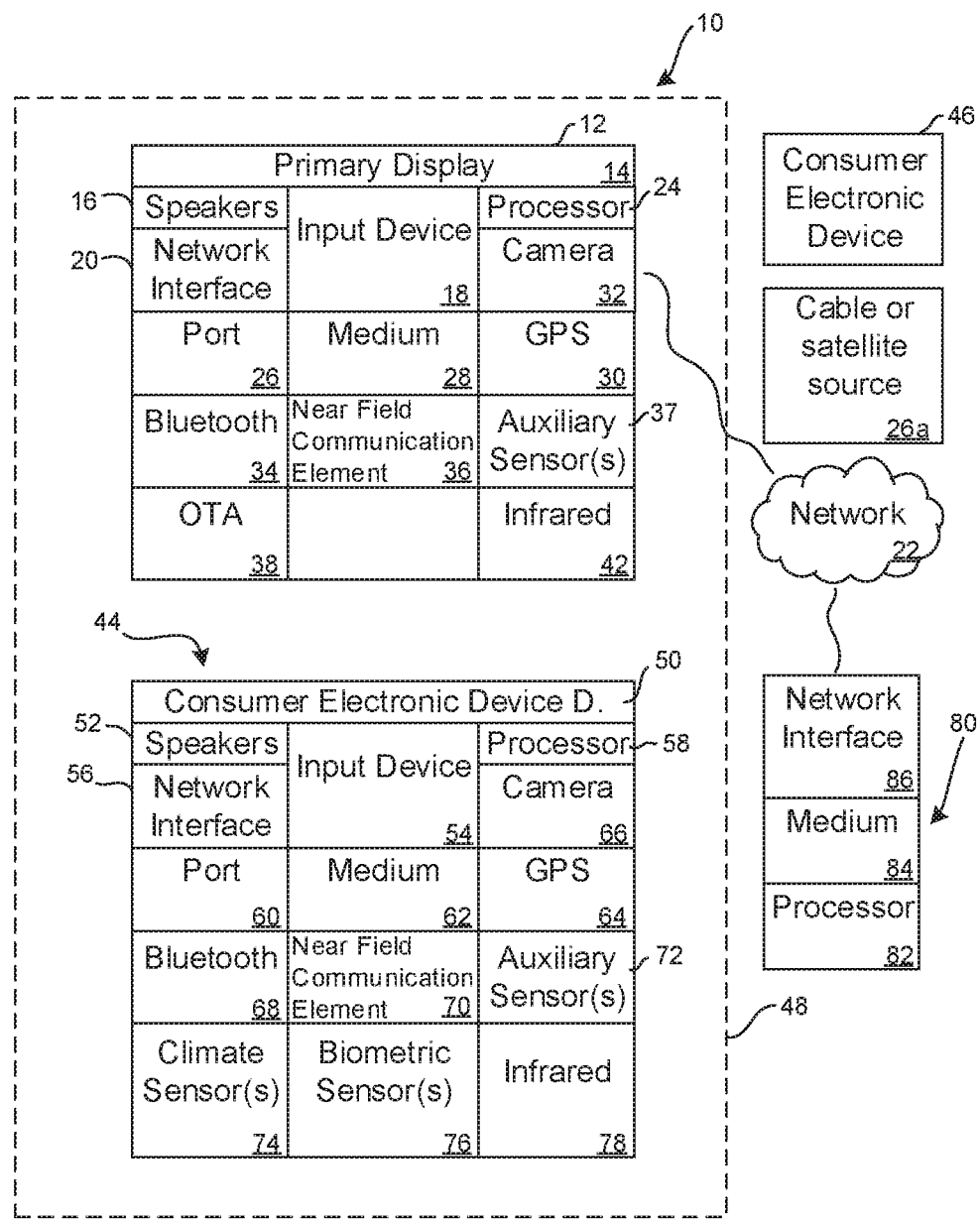
FIG. 1 is a block diagram of an example system including an example in accordance with present principles.

Some of the acronyms used herein include:
TLS=transport layer security
ECDH=elliptic curve Diffie-Hellman (anonymous key agreement protocol)
AES=advanced encryption standard
CBC=cipher block chaining
SHA=secure hash algorithm This disclosure relates generally to computer ecosystems including aspects of consumer electronics (CE) device networks such as but not limited to distributed computer game networks. A system herein may include server and client components, connected over a network such that data may be exchanged between the client and server components. The client components may include one or more computing devices including game consoles such as Sony Playstation™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
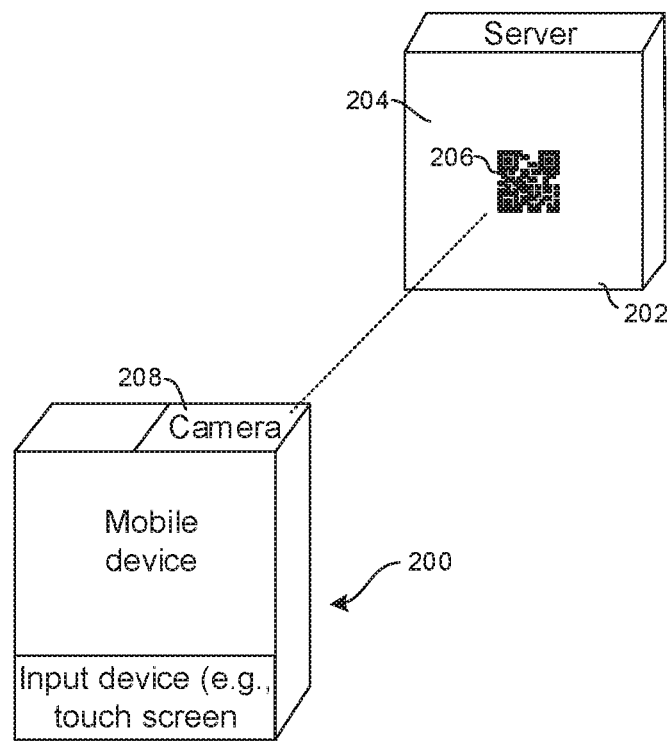
FIG. 2 is a schematic diagram of a mobile device and a server using the QR method.
Figure 3:
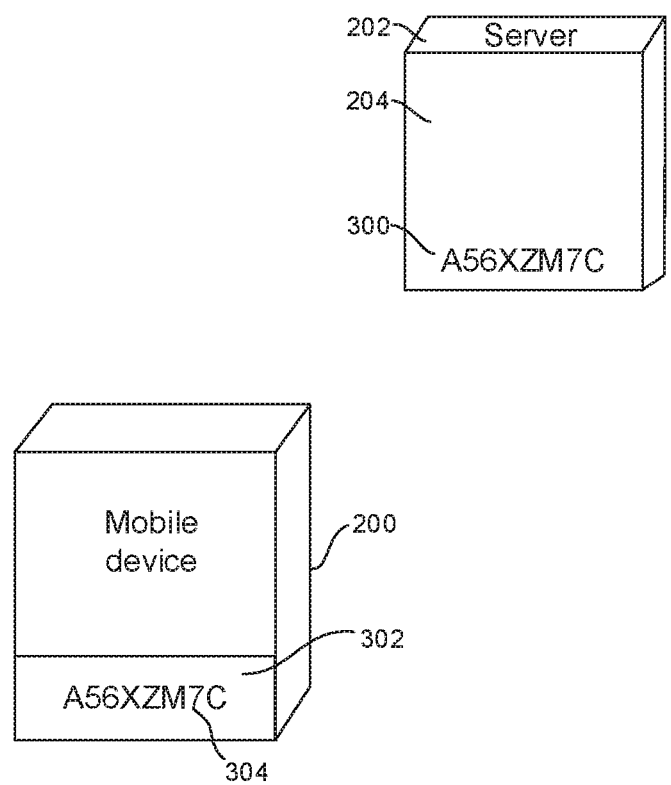
FIG. 3 is a schematic diagram of a mobile device and a server using the passcode method.
Figure 4:
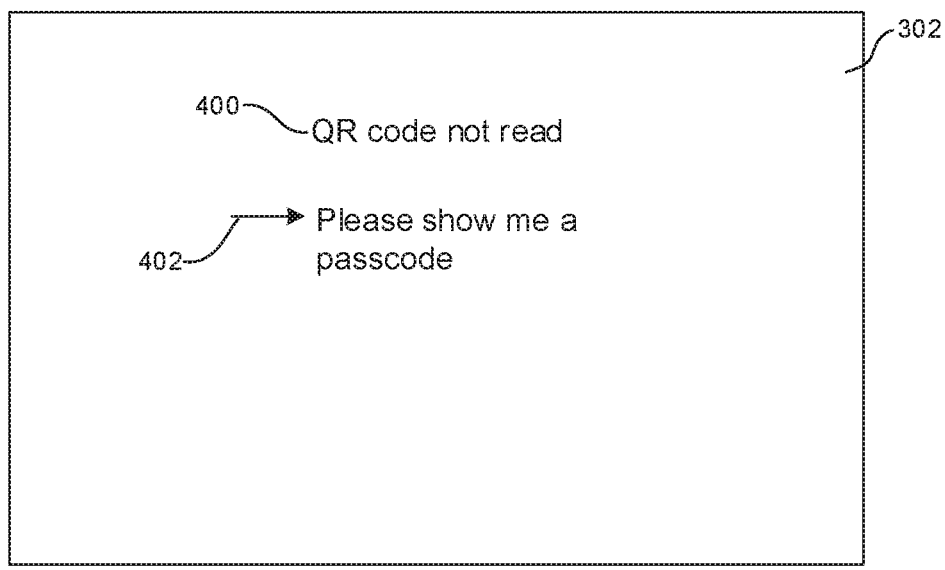
FIG. 4 is a screen shot of an example user interface (UI) that can be presented on the mobile device when the QR method fails.

FIGS. 2-4 illustrate general principles whose algorithmic details in example embodiments are described further in reference to FIGS. 5-8. FIG. 2 shows a mobile device 200 (also referred to below as a "mobile") and a server device ("server") 2-2 with a server display 204 on which can be presented a machine-readable quick response (QR) code 206. This code may be read by the mobile 200 using a camera 208 (visible or IR based) on the mobile. The server and mobile may be established by any of the devices described above and may incorporate some or all of the components described above. As explained further below, the QR code subsequently is used to establish a secure communication channel between the mobile and the server.

FIG. 3 shows that alternatively to presenting a machine-readable QR code, a pseudorandomly generated passcode 300 of, e.g., eight digits may be presented on the server display 204. This passcode can be viewed by a user of the mobile 200 and input, using an input device 302 such as a touch screen, to the mobile by typing in a facsimile 304 to the mobile. As explained further below, the passcode subsequently is used to establish a secure communication channel between the mobile and the server.

FIG. 4 illustrates that in some implementations, QR code is preferred over passcode, so that in the event that a QR code presented as shown in FIG. 2 is not read or otherwise operated on by the mobile in accordance with the QR code logic below, a user interface (UI) may be presented on the touch screen 302 of the mobile with a message 400 indicating that the QR code was not read and a prompt 402 that can be selected by the user to switch to the passcode method.

Figure 5:
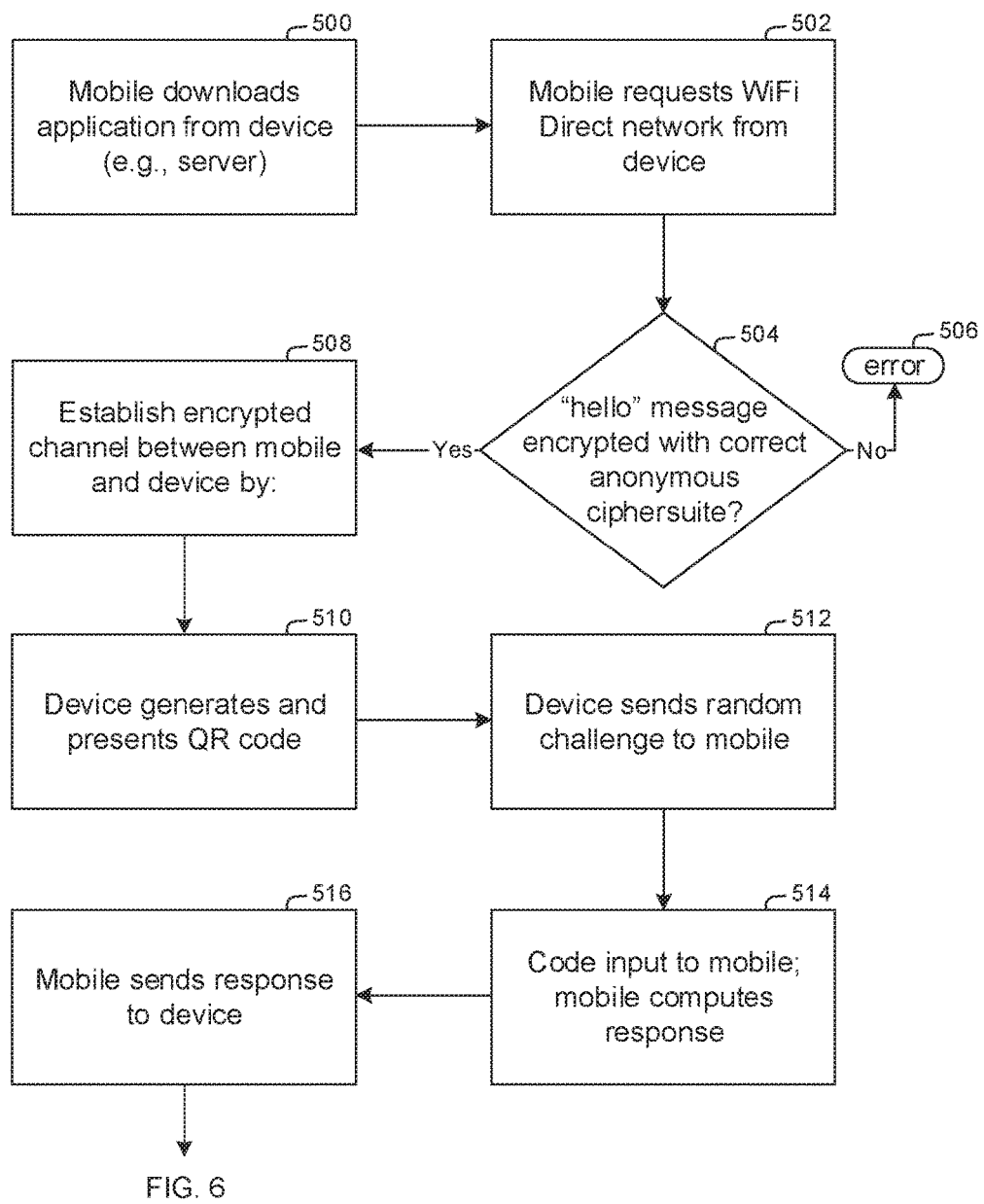
FIGS. 5 and 6 are flow charts of example logic that can be implemented according to the QR method.
Figure 6:
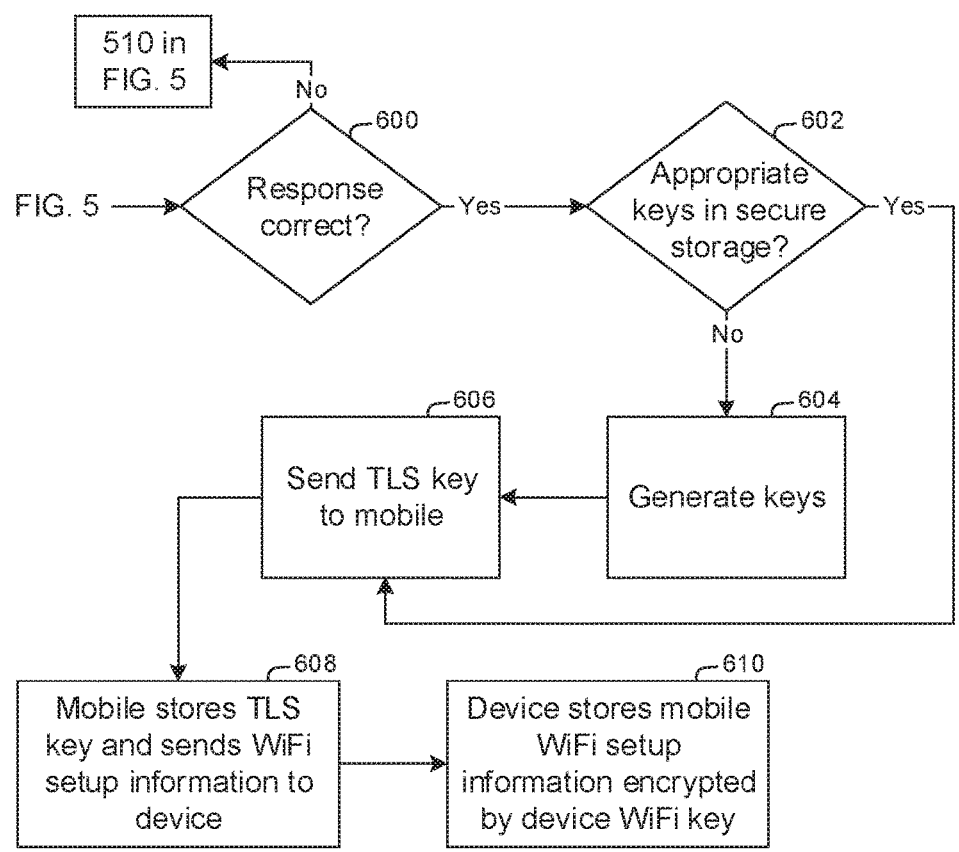

Turning to FIGS. 5 and 6 for an understanding of an example QR code implementation, at block 500 the mobile device ("mobile") downloads a secure communication application from the device (hereinafter "server"). At block 502 the mobile device executing the application requests a WiFi direct network link from the server.

Proceeding to diamond 504, the mobile sends an initial "hello" message to the server which the server receives and determines whether the hello message is encrypted with a correct anonymous ciphersuite. In an example non-limiting implementation, the ciphersuite may be a TLS_ECDH_WITH_AES_256_CBC_SHA ciphersuite, although other ciphers may be used. The below-described TLS key component $S_T$ can be used to encrypt the secure channel using the ciphersuite. This avoids needing to use ciphersuites with perfect forward security (DHE-based handshakes) due the ephemeral nature of secrets being passed between the devices. Also, AES-based TLS-PSH ciphersuites have very fast handshakes.

If the server determines at diamond 504 that the hello message from the mobile is not correctly encrypted with the anonymous ciphersuite, an error may be returned at state 506. If the server determines at diamond 504 that the hello message from the mobile is correctly encrypted with the anonymous ciphersuite, the logic may proceed to block 508 to establish an encrypted channel between the mobile and server as follows.

Proceeding to block 510, the server generates and presents a QR code on a display controlled by the server as mentioned above. This QR code is encrypted when in electronic form, and is presented in the clear in its machine-readable form as shown in FIG. 2 for scanning. The QR code can contain a pseudorandom key value Q with at least 128 bits of entropy.

Moving to block 512, the server sends a random challenge C to the mobile to scan the QR code into the mobile. Accordingly, at block 514 the user of the mobile can move the mobile close enough to the screen of the server to scan the QR code using an appropriate camera, e.g., visible or IR, to input the QR code to the mobile. The mobile then computes a response R using the QR code. In an example, R=SHA256 (Q||C). The mobile sends the response R to the server at block 516, at which point reference to FIG. 6 is made.

As indicated at diamond 600 in FIG. 6, the server determines whether the response R from the mobile is correct. If it is not, the logic may loop back to block 510 in FIG. 5. Otherwise, if R is correct the logic may proceed to diamond 602 to determine whether appropriate TLS and WiFi encryption keys are in secure storage of the server. If they are not, the keys are generated at block 604 and stored in secure storage. From block 604 or from diamond 602 if the keys are already in storage, logic proceeds to block 606.

Before describing block 606, an example non-limiting implementation of the keys in secure storage alluded to above will be described. Any device herein including the server can include a changeable hardware root key "H" stored during manufacture in a secure region of hardware storage of the server. The root key H can be implemented in secure manner that does not allow general reading, just derivation of other keys.

The root key H thus is an encryption key that is permanently embedded in, e.g., Trusted Platform Module (TPM) security hardware, generally at the time of manufacture. In an example, the root key H is implemented using eFuse techniques that "etch" or hard code the root key into the TPM.

The root key H is used to establish various other keys, and these keys are stored in an encrypted region of memory such as flash memory of the server. Each key derived from the root key H may be designated by an initial letter "S" and can be wiped from memory upon factory reset. These derived keys can include a master key component $S_M$, a TLS pre-shared key (PSK) component $S_T$, a Wifi configuration key component $S_W$, and one or more application verification keys $S_A$. The master key component $S_M$ is established by deriving it from the root key H, in one implementation by combining the root key H, such as by an XOR operation, with a pseudorandom number referred to as a benign key split, mathematically represented as follows:

M=kdf (H, $S_M$), where kdf=key derivation function, H=root key, $S_M$=master key component, and M=master key.

The master key is subsequently used to encrypt the other keys described below. Thus, for example, the TLS-PSK key=kdf (M, $S_T$). The keys including the master key component can be stored in the secure region of flash memory, which may be encrypted using a random access encryption mode such as AES, XEX encryption mode with tweak and ciphertext stealing (XTS) having a first tweak value equal to a key number of the derived key and a second tweak value equal to an AES block number, Liskov, Rivest, Wagner (LRW) encryption, cipher block chaining-mask-cipher block chaining (CMC) encryption, electronic codebook-mask-electronic codebook (EME) encryption. If AES-XTS is used the server may generate a 16 byte mask L and store it plaintext in the first 16 bytes of the secure flash region. The encryption key used to encrypt the region 206 can be the AES-XTS key, which is equal to "H" (the root key) XOR "L" (the 16 byte mask). Note that 128, 192, and 256 byte masks may alternatively be used.

With the above understanding of an example implementation of key generation in mind, attention is returned to block 606, wherein the server sends to the mobile the TLS-PSK key. The mobile stores this key at block 608 in device/app storage of the mobile. The mobile also sends its WiFi configuration information, including its WiFi passphrase and potential PII, to the server, potentially encrypted with the TLS-PSK key. At block 610 the server stores, preferably in the secure portion of flash at the server, the mobile's WiFi information and encrypts it with the WiFi key derived according to principles above from the server's master key M.

Figure 7:
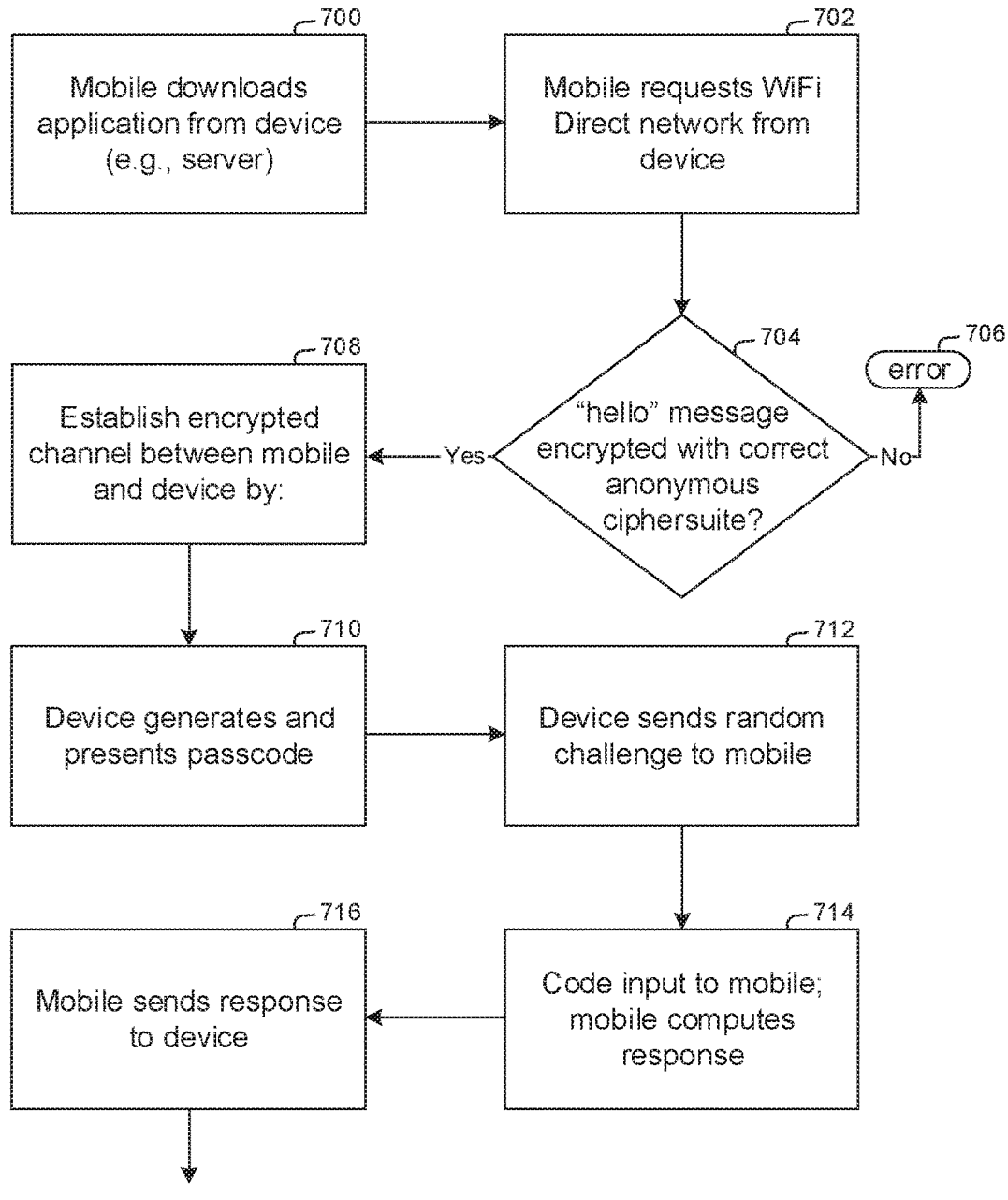
FIGS. 7 and 8 are flow charts of example logic that can be implemented according to the passcode method.
Figure 8:
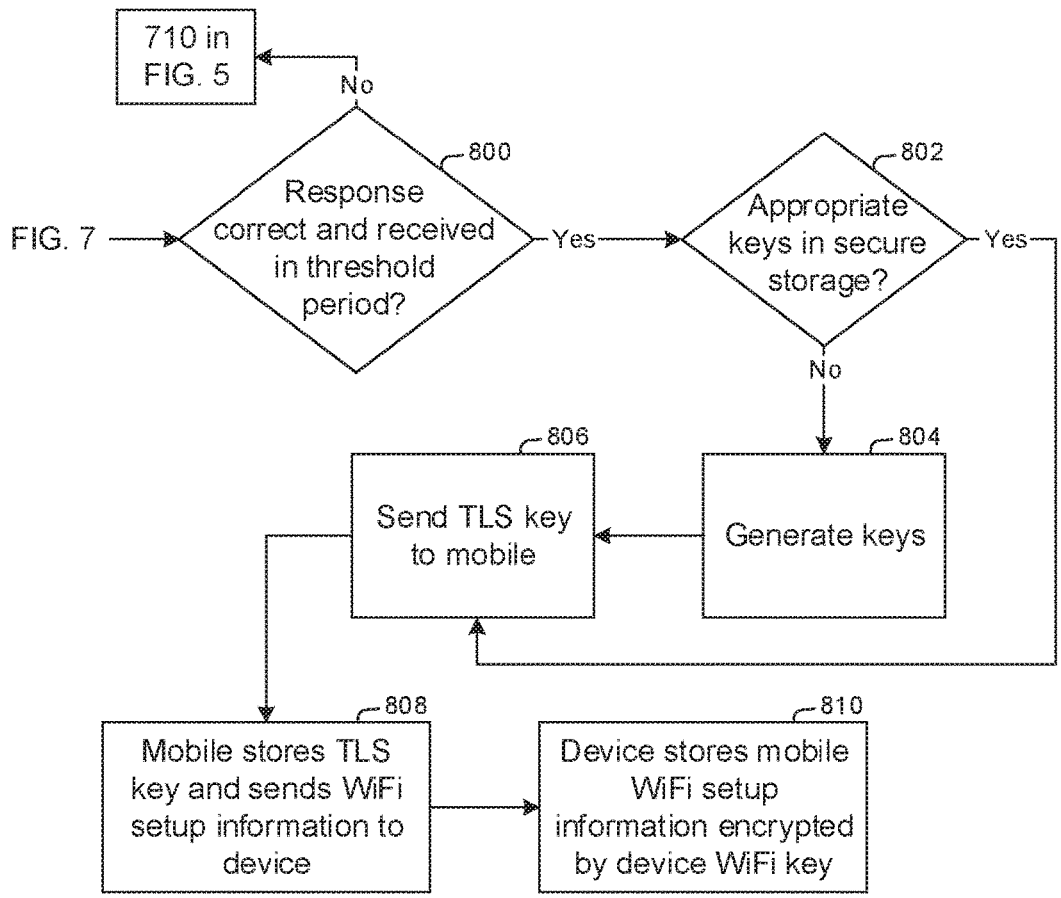

FIGS. 7 and 8 illustrate the passcode implementation. At block 700 the mobile device downloads a secure communication application from the server. At block 702 the mobile device executing the application requests a WiFi direct network link from the server.

Proceeding to diamond 704, the mobile sends an initial "hello" message to the server which the server receives and determines whether the hello message is encrypted with a correct anonymous ciphersuite. If the server determines at diamond 704 that the hello message from the mobile is not correctly encrypted with the anonymous ciphersuite, an error may be returned at state 706. If the server determines at diamond 704 that the hello message from the mobile is correctly encrypted with the anonymous ciphersuite, the logic may proceed to block 708 to establish an encrypted channel between the mobile and server as follows.

Proceeding to block 710, the server generates and presents a pseudorandom passcode of, e.g., eight digits (although other numbers of digits may be used) on the display controlled by the server as mentioned above. This passcode is in human-readable form. Moving to block 712, the server sends a random challenge C to the mobile to input the passcode into the mobile. Accordingly, at block 714 the user of the mobile can look at the passcode presented on the server display and input the passcode using an input device to the mobile. The mobile then computes a response R using the passcode. In an example, R=SHA256 (Q||C). The mobile sends the response R to the server at block 716, at which point reference to FIG. 8 is made.

As indicated at diamond 800 in FIG. 8, the server determines whether the response R from the mobile is correct and whether the response is received within a threshold period, e.g., within 30 seconds of presenting the passcode on the display of the server. If either test fails (i.e., incorrect passcode or correct passcode but received outside the threshold period), the logic may loop back to block 710 in FIG. 7. Otherwise, if both criteria are satisfied (a correct R received within the threshold period) the logic may proceed to diamond 802 to determine whether appropriate TLS and WiFi encryption keys are in secure storage of the server. If they are not, the keys are generated at block 804 and stored in secure storage. From block 804 or from diamond 802 if the keys are already in storage, logic proceeds to block 806. Key generation may proceed along the lines discussed above in reference to the QR method of FIGS. 5 and 6.

At block 806 the server sends to the mobile the TLS-PSK key. The mobile stores this key at block 808 in device/app storage of the mobile. The mobile also sends its WiFi configuration information, including its WiFi passphrase and potential PII, to the server, potentially encrypted with the TLS-PSK key. At block 810 the server stores, preferably in the secure portion of flash at the server, the mobile's WiFi information and encrypts it with the WiFi key derived according to principles above from the server's master key M.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   responsive to a determination that a hello message from a mobile communication device (MCD) comprises a ciphersuite, establish communication with the MCD);
   present on a display a passcode P;
   send to the MCD a challenge C;
   responsive to determining that a response from the MCD based on P and C and matches a test value, and responsive to a determination that P was displayed less than a threshold period of time prior to receiving the response, return an encryption key to the MCD;
   responsive to not receiving a response from the MCD matching the test value, or responsive to a determination that P was displayed greater than the threshold period of time prior to receiving the response, generate a new P and C;
   wherein the encryption key is obtained at least in by:
   accessing a first key of the device;
   using the first key to establish a second key;
   using the second key to establish the encryption key, the encryption key being sent to the MCD to enable the MCD to encrypt information with the encryption key.

2. The device of claim 1, comprising the at least one processor coupled to the at least one computer memory.

3. The device of claim 1, wherein the instructions are executable to:
   access a root key of the device;
   use the root key of the computing device to establish a master key;
   use the master key to establish the communication key; and
   send the communication key to the MCD to enable the MCD to encrypt WiFi information with the communication key.

4. The device of claim 3, wherein the instructions are executable to:
   store the communication key in a secure area of storage encrypted with a random encryption code.

5. The device of claim 4, wherein the random encryption code includes advanced encryption standard (AES) XEX encryption mode.

6. The device of claim 5, wherein the AES XEX encryption mode has tweak and ciphertext stealing (XTS) having a first tweak value equal to a key number of the derived key and a second tweak value equal to an AES block number.

7. The device of claim 4, wherein the random encryption code includes Liskov, Rivest, Wagner (LRW) encryption.

8. The device of claim 4, wherein the random encryption code includes cipher block chaining-mask-cipher block chaining (CMC) encryption.

9. The device of claim 4, wherein the random encryption code includes electronic codebook-mask-electronic codebook (EME) encryption.

10. The device of claim 3, wherein the instructions are executable to:
    access the WiFi information received from the MCD;
    encrypt the WiFi information using a WiFi key derived from the master key.

11. A device comprising:
    at least one computer memory that is not a transitory signal and that comprises instructions executable by at least one processor to:
    responsive to a determination that a hello message from a mobile communication device (MCD) comprises a ciphersuite, establish communication with the MCD;
    generate a value Q;
    embed Q in a machine-readable quick response (QR) code;
    present the QR code to the MCD;
    send to the MCD a challenge C;
    responsive to determining that a response from the MCD is based on a combination of Q and C and matches a test value, return an encryption key to the MCD;
    responsive to not receiving a response from the MCD matching the test value, not return an encryption key to the MCD, wherein the encryption key is obtained at least in by:
    accessing a first key of the device;
    using the first key to establish a second key;
    using the second key to establish the encryption key, the encryption key being sent to the MCD to enable the MCD to encrypt information with the encryption key.

12. The device of claim 11, comprising the at least one processor coupled to the at least one computer memory.

13. The device of claim 11, wherein the instructions are executable to:
    access a root key of the device;
    use the root key of the computing device to establish a master key;
    use the master key to establish the communication key; and
    send the communication key to the MCD to enable the MCD to encrypt WiFi information with the communication key.

14. The device of claim 13, wherein the instructions are executable to:
    access the WiFi information received from the MCD; and
    encrypt the WiFi information using a WiFi key derived from the master key.

15. A mobile communication device (MCD) comprising:
    at least one computer memory that is not a transitory signal and that comprises instructions executable by at least one processor to:
    receive a visible code generated by a server;
    combine the code with a challenge received from the server to render a response;
    send the response to the server;
    responsive to the code being correct as determined by the server, access a communication key received from the server; and
    send to the server wireless communication configuration information.

16. The MCD of claim 15, wherein the code is a machine-readable code received from an imaging device of the MCD.

17. The MCD of claim 15, wherein the code is a human-readable code received form an input device of the MCD.

18. The MCD of claim 15, wherein the instructions are executable to encrypt the wireless communication configuration information using the communication key prior to sending the wireless configuration information to the server.

19. The MCD of claim 15, wherein the instructions are executable to:

present on a display of the MCD a user interface (UI) including at least one selector selectable to enter a mode in which the code is a human-readable passcode.

\* \* \* \* \*